United States Patent
Toohey

(10) Patent No.: US 9,518,862 B2
(45) Date of Patent: Dec. 13, 2016

(54) WEIGHING APPARATUS REZERO FAULT PREDICTION AND REMOTE ALERTING

(71) Applicant: Mettler-Toledo, LLC, Columbus, OH (US)

(72) Inventor: Patrick Toohey, Cortland, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 135 days.

(21) Appl. No.: 14/532,718

(22) Filed: Nov. 4, 2014

(65) Prior Publication Data

US 2016/0123794 A1    May 5, 2016

(51) Int. Cl.
| | | |
|---|---|---|
| *G01G 23/01* | (2006.01) | |
| *G01G 23/16* | (2006.01) | |
| *G01G 23/37* | (2006.01) | |
| *G01G 23/18* | (2006.01) | |

(52) U.S. Cl.
CPC ............ *G01G 23/18* (2013.01); *G01G 23/166* (2013.01); *G01G 23/3735* (2013.01)

(58) Field of Classification Search
CPC .... G01G 23/01; G01G 23/18; G01G 23/3735; G01G 23/3707; G01G 19/417; G01G 23/166

See application file for complete search history.

(56) References Cited

U.S. PATENT DOCUMENTS

| | | | |
|---|---|---|---|
| 5,220,517 A | 6/1993 | Sierk et al. | |
| 5,606,153 A | 2/1997 | Fix, Sr. et al. | |
| 5,878,376 A | 3/1999 | Schurr | |
| 6,041,289 A | 3/2000 | Schimitzek | |
| 6,080,938 A | 6/2000 | Lutz | |
| 6,580,037 B1 * | 6/2003 | Luke ................. | G01G 23/3707 177/25.13 |
| 6,777,624 B2 * | 8/2004 | Hamamoto ............ | G01G 23/01 177/25.13 |
| 6,844,506 B2 | 1/2005 | Nüesch et al. | |
| 6,970,094 B2 | 11/2005 | Yamashita et al. | |
| 7,533,799 B2 | 5/2009 | Edwards | |
| 7,640,130 B2 | 12/2009 | Churan et al. | |
| 7,684,946 B2 | 3/2010 | Susor | |
| 7,706,995 B2 | 4/2010 | Sullivan et al. | |
| 2004/0050593 A1 | 3/2004 | Baeumel et al. | |
| 2006/0129505 A1 | 6/2006 | Kunde | |

* cited by examiner

*Primary Examiner* — Randy W Gibson
(74) *Attorney, Agent, or Firm* — Standley Law Group LLP

(57) ABSTRACT

Systems and methods for remotely monitoring the rezero status of a weighing apparatus, such as a checkweigher. Remotely located interested parties may sign up for notifications related to the weighing apparatus rezero status, and the interested parties may be automatically electronically notified when certain status conditions occur. A hierarchy of notifications may be established such that not all interested parties will receive every notification. System and method embodiments may also operate to identify certain trends in rezero data and to resultantly predict future rezero faults.

21 Claims, 5 Drawing Sheets

WEIGHING APPARATUS REZERO FAULT PREDICTION AND REMOTE ALERTING

TECHNICAL FIELD

Embodiments of the invention are generally directed to weighing apparatus for weighing and conveying items of various shape and size and, more particularly, to a system and method for monitoring the rezero function of such a weighing apparatus and providing related electronic notifications to remotely located interested parties.

GENERAL BACKGROUND

Various types of weighing apparatus (e.g., scales) are known and would be familiar to one of skill in the art. These apparatus may include static weighing scales such as, without limitation, electronic analytic and laboratory scales, retail scales, and industrial scales.

An apparatus in the form of a checkweigher for weighing moving objects (e.g., packages) is also known, and various checkweigher designs exist for this purpose. In general, however, a checkweigher may be described as a high-speed weighing device for the in-motion weighing of objects as the objects travel along a conveyor. A checkweigher is typically installed to a conveyor line such that an infeed conveyor is provided for delivering objects to the checkweigher and a discharge conveyor is provided to transport objects from the checkweigher to a downstream location. The checkweigher itself also typically employs a conveyor to transport objects one at a time across a static scale, which is essentially a vertically deflectable mechanism operable to effect weighing of the moving objects.

All weighing scales, including checkweighers, employ a sensor that transforms the weight of an object into a usable signal. Typically, this signal is converted into a readable value by some type of analog-to-digital (A/D) converter. Sensors typically used for this purpose include, for example, strain gauge load cells, electromagnetic force restoration weigh cells, or other sensors such as capacitive or inductive sensors.

Regardless of the specific type, all such checkweighers or other weighing apparatus will, over time, typically experience a slight change in weighing characteristics. Such a change in weighing characteristics may be due to, for example, a buildup of material on the load receiving surface (e.g., weighpan or load platform) and/or to the drift (change in output under a constant load) of the weighing sensor (e.g., load cell) as a result of changes in operating temperature, etc. This is particularly true for weighing apparatus that use sensors that are not highly accurate, such as strain gauge load cells. To a lesser degree, this is also true for weighing apparatus that use more accurate sensors, such as electromagnetic force restoration load cells.

As a consequence of the aforementioned slight change in weighing characteristics, the checkweigher or other weighing apparatus is typically required to go through a rezero operation on some periodic basis or in response to the observation of certain production parameters. A rezero operation reestablishes the zero value of the weighing apparatus. That is, the rezero operation allows the weighing apparatus to compensate for the environmental or other factors that have changed its weighing characteristics and to once again read zero when in an actual unloaded state.

A rezero operation is accomplished by causing the weighing apparatus to take a deadload weight measurement. Normally, the deadload weight of a weighing apparatus is the weight of the unloaded weighing apparatus weighpan or load platform. Therefore, during a rezero operation, the weighing apparatus is required to take a weight reading when no object is present on the weighpan or load platform and, if the deadload weight reading differs from a previous deadload weight reading, to establish a new zero value at the current deadload weight reading value (i.e., to rezero the weighing apparatus).

In the case of checkweighers, a periodic gap in production (i.e., a gap between objects crossing the scale thereof) is required in which to reestablish the zero value (to perform a rezero operation). Given a sufficient gap in production, a checkweigher may be programmed to automatically measure the deadload weight of the scale weighpan, which deadload weight measurement will become the new zero value provided it does not exceed a specified threshold (e.g., 2% of the scale maximum scale load). Violations of the rezero threshold may occur due to the conditions noted earlier: product buildup or drift. If a good rezero point is not established on a regular basis, the accuracy of the checkweigher will likely be reduced.

To ensure proper weighing accuracy, a checkweigher or other weighing apparatus may be designed to require a rezero on a periodic basis. From a last good rezero, a checkweigher or other weighing apparatus may be required to rezero again on some predetermined schedule, such as by using either a timer or an item counter. When such a rezero point occurs, a checkweigher may attempt to rezero as soon as a sufficient gap in production is presented. Upon a successful rezero, the timer or other trigger associated with the checkweigher or other weighing apparatus is usually reset. However, if a new rezero cannot be established within some allotted time frame, then the checkweigher or other weighing apparatus typically enters a "needs rezero" condition, which is also commonly referred to as a rezero fault.

Known checkweighers and other weighing apparatus may alert an operator of a rezero fault, such as by energizing a light or buzzer, illuminating a section of the human-machine interface (HMI) display, etc. In the case of a checkweigher, an operator can typically remedy a rezero fault by either manually providing a gap in production (i.e., removing items from conveyor to produce a gap) that is sufficient to allow a rezero, or by cleaning the weighpan to remove product buildup.

If a rezero cannot be completed by the weighing apparatus, then use of the weighing apparatus may need to be suspended because continued use may result in inaccurate weight readings. For example, in the case of a checkweigher, the infeed conveyor may be stopped so that no additional product is transferred over the scale and weighed, or the checkweigher may be shut down entirely. This is, of course, problematic at least in the sense that it interrupts production and will remain an interruption until an operator or other personnel can remedy the rezero fault. In a situation where the checkweigher or other weighing apparatus operates unattended or where only limited operator support is available, such a situation can seriously impact production.

Ultimately, checkweighers and other weighing apparatus must be periodically rezeroed in order to ensure the proper and accurate operation of the weighing function. It is obviously desirable that rezeroing occurs as required with as little as possible risk of process failure or process interruption. Consequently, it can be understood that a rezero monitoring system and method that tracks each rezero operation and identifies any trend toward an inevitable rezero fault would be beneficial to preventing a future interruption of weighing apparatus operation. Further, the drawbacks associated with requiring an operator to be constantly or very frequently present at a weighing apparatus should also be apparent, and eliminating such a requirement would be desirable as well. It can, therefore, be understood that a rezero monitoring system and method that notifies operators and/or other remotely located interested parties of a predicted or actual rezero fault would also be beneficial. System and method embodiments according to the invention provide such benefits.

SUMMARY

Exemplary embodiments of the invention are directed to systems and methods for monitoring the rezero function of a weighing apparatus, such as a checkweigher, for predicting a future rezero fault, and for notifying operators and/or other interested parties of a predicted or actual rezero fault. Therefore, one aspect of embodiments of the invention is to identify from completed rezero operations any trend toward a rezero fault. For example, it may be predicted from the captured deadload measurements associated with completed rezero operations of a given weighing apparatus that the deadload measurement will exceed a predetermined threshold value and the rezero will fail within some next number of rezero operations.

Another aspect of exemplary embodiments of the invention is the automatic alerting of locally and/or remotely located interested parties (e.g., operators, supervisors, maintenance personnel, etc.) of a predicted or actual rezero fault and, therefore, to a need for a successful rezero. In the case of a predicted rezero fault, such an alert may be sent, for example, when a scheduled rezero is within some number of rezero operations from the occurrence of the predicted rezero fault, or even as soon as a predicted zero fault is identified.

In the case of an actual rezero fault, such an alert may be sent, for example, only when a rezero threshold is exceeded. Alternatively, an alert may be sent when a rezero operation has failed to complete within an allotted time or when a rezero operation has been interrupted some number of times within a given time period. Such a failure or interruption may be caused, for example, by the appearance of a product to be weighed before the rezero operation is completed, by operator termination or override of a rezero operation, or by a failure of one or more components of a weighing apparatus that are involved in a rezero operation. The number of times that a rezero operation may be interrupted before causing a rezero fault may vary and may be settable by a user. The number of times that a rezero operation may be interrupted before causing a rezero fault may be arbitrarily selected or may be based on an observation of, for example, the average time required for build up and/or other factors to unacceptably affect the readings of a given weighing apparatus. In any case, the interested parties to be contacted may be determined (set) in a number of ways, such as by direct or indirect registration. An alerting hierarchy may also be established.

A system and method embodiment of the invention may also be used to monitor weighing apparatus functions other than rezeroing events and weighing-related process parameters. For example, a system and method of the present invention may also be used to monitor the function of non-weighing components of a weighing apparatus and/or to monitor associated devices such as conveyors, reject mechanisms, etc. Consequently, a system and method of the present invention may also be used to alert interested parties when a non-weighing component of a weighing apparatus or an associated device exceeds some predetermined process threshold or otherwise operates in an inappropriate manner (including becoming non-operational).

DETAILED DESCRIPTION OF THE EXEMPLARY EMBODIMENTS

Exemplary embodiments of the invention are directed to systems and methods for monitoring the rezero function of a weighing apparatus, such as a checkweigher. Exemplary embodiments of the invention track rezero process parameters such as the rezero status (e.g., needs rezero (rezero fault), good rezero) and the rezero weight values (i.e., last rezero measurement) of a weighing apparatus and report the rezero process parameters to interested parties. In certain embodiments, a local system archives the reported rezero process parameters and analyzes reported rezero process parameters to identify a rezero fault or a trend indicative of a future rezero fault. In other embodiments, rezero process parameters are reported to a remote system, which archives the reported rezero process parameters and analyzes reported rezero process parameters to identify a rezero fault or a trend indicative of a future rezero fault. Other embodiments may include both local and remote tracking, archiving and analysis functionality.

Exemplary embodiments of the invention are also directed to systems and methods for alerting operators and/or other locally and/or remotely located interested parties of a predicted or actual rezero fault so that the alerted parties can then take appropriate actions in response to an alert. For example, notifying an operator or other appropriate parties of a rezero fault allows for corrective actions that ensure a new good rezero can be achieved. Similarly, reporting a predicted rezero fault allows an operator or other appropriate parties to take corrective actions necessary to avoid the occurrence of a rezero fault and maintain proper weighing apparatus operation. The interested parties to be contacted may be sited at the same location as the weighing apparatus of interest, may be located remotely (offsite), or may be located both locally and remotely. The interested parties to be contacted may be determined (set) in a number of ways, such as by direct or indirect registration. An alerting hierarchy may also be established.

Exemplary system embodiments of the invention may include only local elements that monitor and report weighing apparatus rezero status, or may include both local and remote elements that cooperate to monitor and report weighing apparatus rezero status. The local element includes a local monitoring system that is associated with the weighing apparatus to be monitored. The local monitoring system is generally responsible for collecting and reporting rezero data. When present, the remote element includes at least a remote server to which the local monitoring system reports the collected rezero data, and associated remote server programming. When present, the remote server acts at least to transmit messages and/or alerts related to the received rezero data. In some embodiments, the remote server may also be tasked with analyzing the received rezero data to predict future rezero faults.

Figure 1:
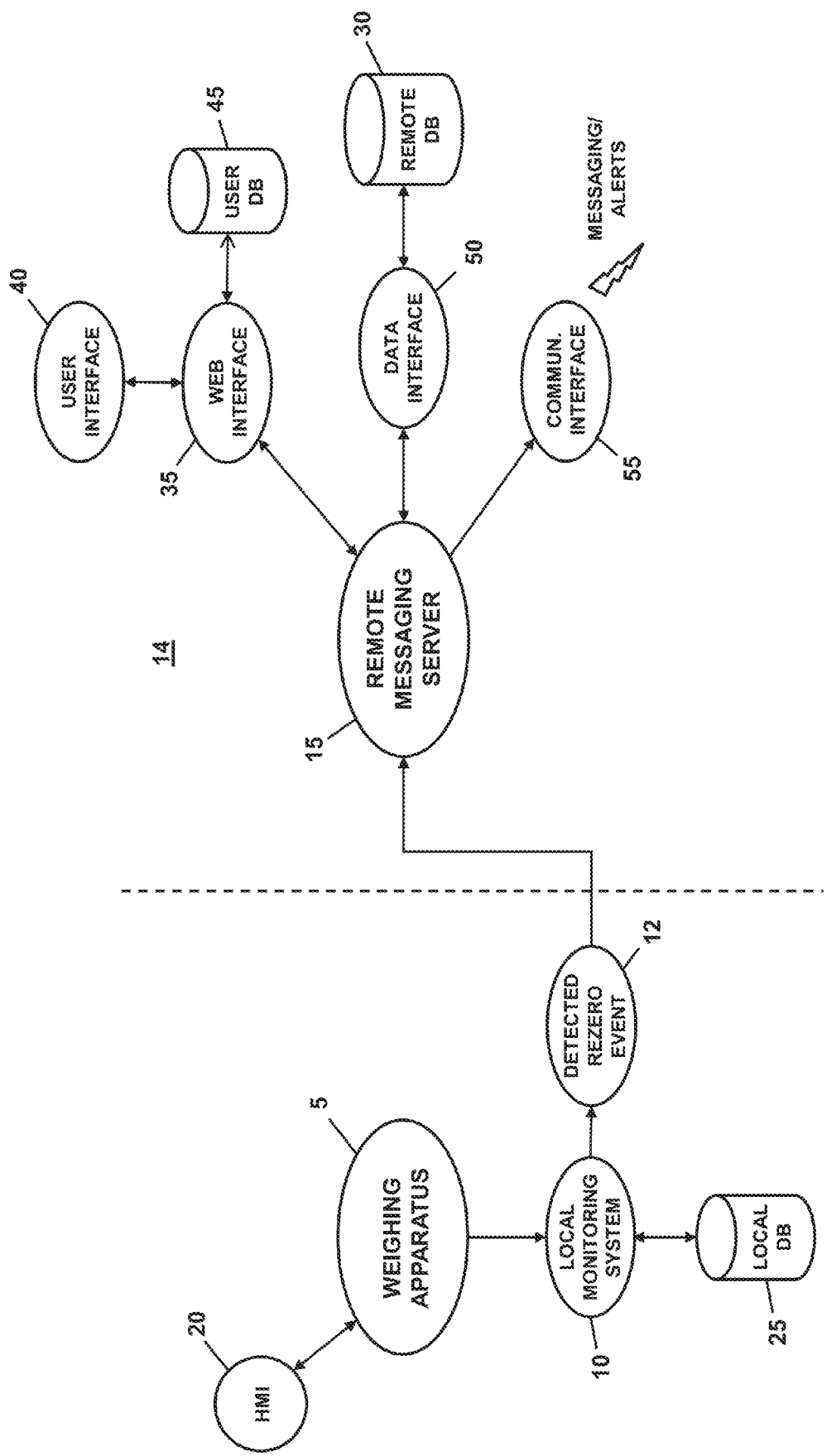
FIG. 1 schematically represents the interactions between various components of an exemplary system and method embodiment of the invention that includes remote notification functionality.

The interactions between various components of an exemplary system and method embodiment of the invention is schematically represented in FIG. 1. As illustrated, this particular exemplary embodiment includes a weighing apparatus (e.g., checkweigher) of interest 5 having a local monitoring system 10 adapted at least to collect rezero data (process parameters) from the weighing apparatus and, optionally, to transmit the rezero data to a remote server 15. The local monitoring system 10 may include sensors or other devices for facilitating data collection and/or may acquire rezero weight data directly from a scale device of the weighing apparatus. For example, rezero data may be acquired directly from a weighing sensor or from an analog-to-digital (A-D) converter that is common to a weigh sensor interface. The local monitoring system 10 may be part of the microprocessor-based control system of the weighing apparatus or may otherwise be in communication therewith.

A human-machine interface (HMI) 20 may be associated with the weighing apparatus for facilitating operator, etc., communication therewith. A local database 25 may also be associated with the weighing apparatus 5 and be in communication with at least the local monitoring system 10, such that rezero data from a rezero event 12, operator data, etc., may be saved locally if desired.

As mentioned above and as explained in more detail below, embodiments of the invention may notify interested parties of predicted or actual rezero faults by way of a local and/or remote service, either of which may be used in combination with alerts (lights, sirens, buzzers, etc.) located on or at a weighing apparatus of interest. In the former case, a local notification service may be provided for and managed by the weighing apparatus itself. In this scenario, messages/alerts would be transmitted from the local monitoring system 10 or a local device(s) in communication with the local monitoring system, instead of from the external system depicted to the right of the dashed line in FIG. 1. Further, the list of event recipients and associated contact methods (e.g. SMS, email, etc.) would be defined at the weighing apparatus. When an associated rezero event is detected 12, the weighing apparatus would be responsible for dispatching the event to the registered users. In such an embodiment, the weighing apparatus of interest would also include software subsystems capable of the respective communication mechanisms.

While a local notification system embodiment may be the simplest solution because it eliminates the need for any external systems, such an embodiment also has limited scalability. For example, in a local service only architecture, the list of event recipients must be specified at each weighing apparatus of interest. For facilities with multiple weighing apparatus, this would be a repetitive and time-consuming task.

The potential inefficiencies associated with a local-only notification system embodiment may be eliminated by employing an external system for configuration and deployment of weighing apparatus event notifications. Referring again to FIG. 1, such an exemplary embodiment is shown to include an external system 14 that employs a remote server 15 which is responsible for acting on the rezero data received from the weighing apparatus 5. At a minimum, the remote server 15 acts in this scenario as a central dispatching server that is responsible for dispatching notifications or other alert messages associated with weighing apparatus rezero events. In an exemplary embodiment, the external system 14 may be implemented as a software service deployed within the network of the facility in which a weighing apparatus of interest is located. The external system 14 may include a consolidated list of notification recipients, thereby eliminating the need to configure each of multiple weighing apparatus individually. The external system 14 may archive the received rezero data in a remote database 30 for further use.

In yet another embodiment, the external system 14 (e.g., the remote server 15) may be further adapted to evaluate the rezero process parameters of the weighing apparatus being monitored in lieu of analysis by the local monitoring system 10. Said, rezero process parameters may include any good rezero status indications and rezero fault status indications, and may also include the last rezero weight measurement. In such an embodiment, the remote server 15 may employ one or more software applications adapted to evaluate the received rezero data and to identify and act on any actual or predicted rezero faults. Such a software application(s) may reside on the remote server 15 or on another server, computer, etc., in communication therewith.

In any case, the various exemplary embodiments of the invention are adapted to monitor and analyze rezero data received from a weighing device of interest in order to identify (predict) potential future rezero faults. To this end, the local monitoring system 10 and/or the remote server 15 may store the weight reading from the load cell or other weight indicating device each time the weighing apparatus of interest transmits rezero data to the remote server. This allows for the collection of rezero weight data over some extended time period and for the analysis of historical weight data, via appropriate programming, to identify any trends that are suggestive of a future rezero fault.

Figure 2:
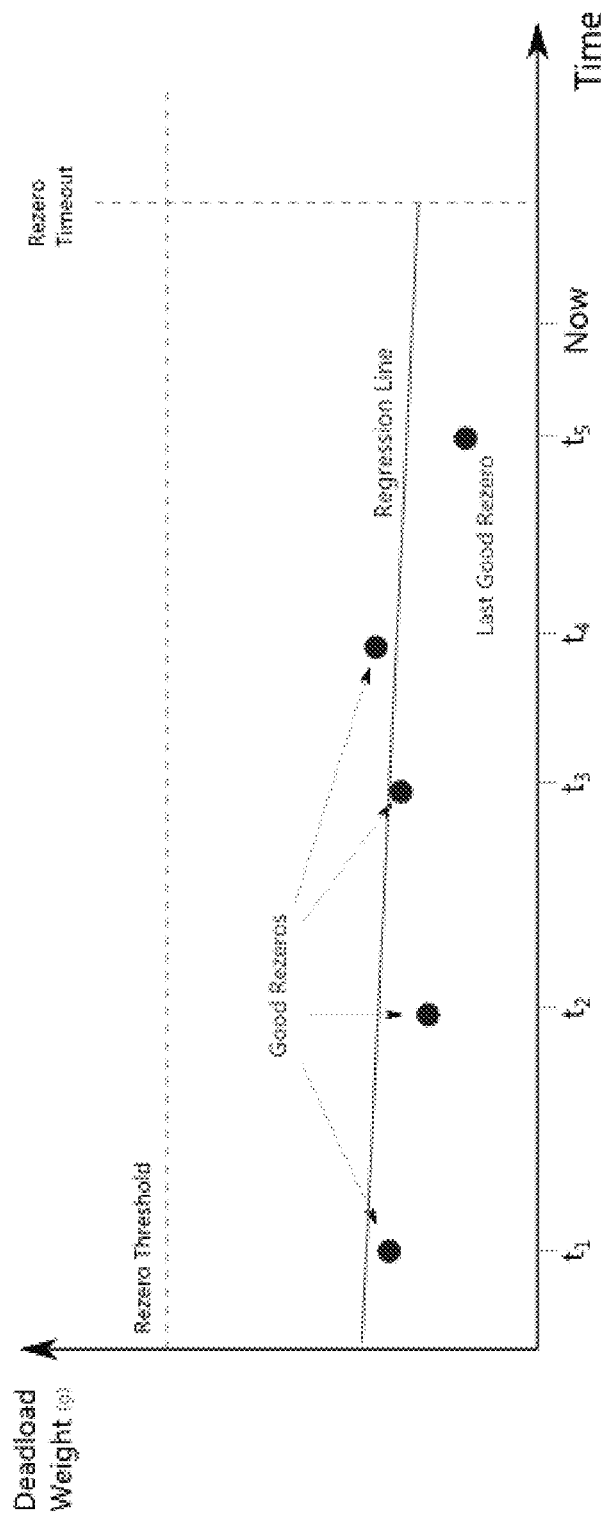
FIG. 2 is a graph representing a pattern of deadload weight measurements associated with several weighing apparatus rezero operations where no rezero fault has occurred or is predicted.
Figure 3:
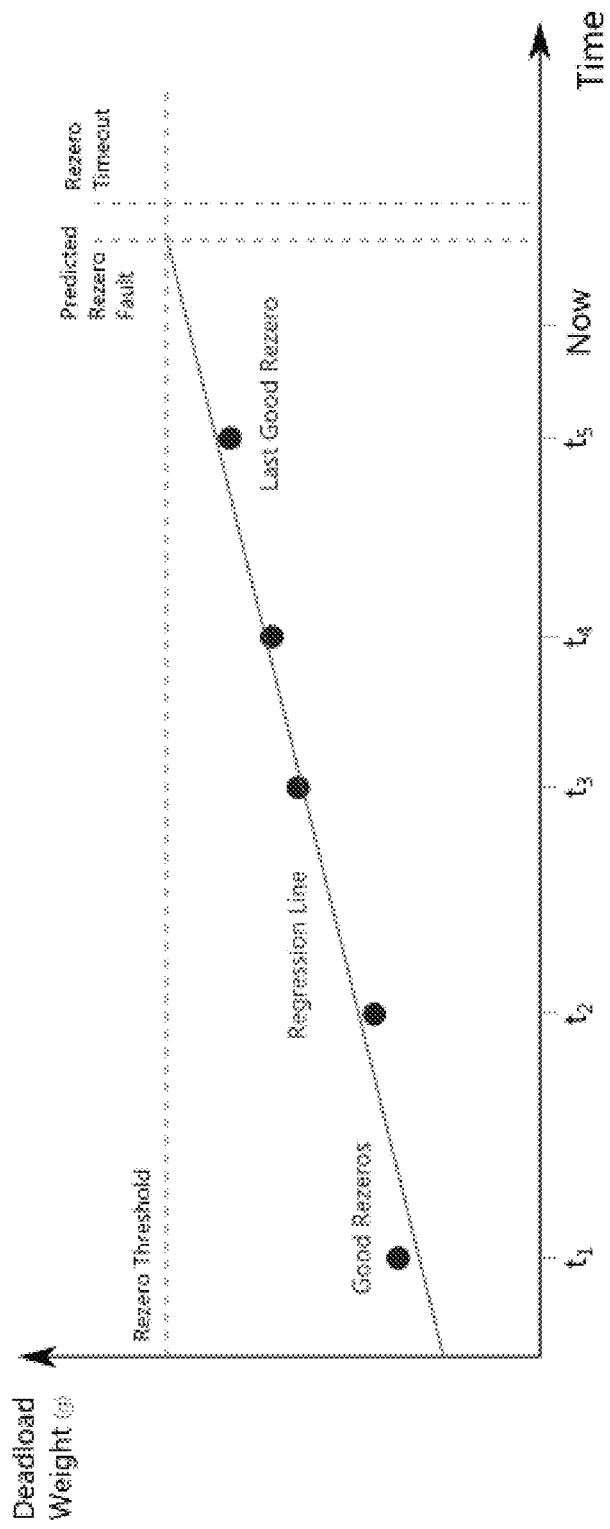
FIG. 3 is a graph representing a pattern of deadload weight measurements associated with several weighing apparatus rezero operations that is predictive of a rezero fault.

Rezero fault prediction according to the invention may be better understood by reference to the graphs of FIGS. 2-3. FIG. 2 reflects a series of deadload weight readings associated with five good rezeroes and received from a monitored weighing apparatus at times $t_1$-$t_5$. The graph of FIG. 2 also indicates the current point in time relative to the already recorded rezero weight readings and the next rezero timeout (i.e., the next scheduled rezero operation). It can be seen that there also exists a predetermined rezero threshold in the form of a maximum deadload weight that may be associated with a given rezero operation. None of the weight readings $t_1$-$t_5$ of FIG. 2 exceed the rezero threshold, thus, there has been no actual rezero fault. Further, passing a regression line through weight reading points $t_1$-$t_5$ illustrates that the weighing apparatus is operating under control and that there is no indication of a forthcoming rezero fault.

FIG. 3 similarly shows a series of deadload weight readings associated with five good rezeroes and received from a monitored weighing apparatus at times $t_1$-$t_5$, as well as the current point in time relative to the already recorded rezero weight readings and the next rezero timeout (i.e., the next scheduled rezero operation). It can be seen that there again exists a predetermined rezero threshold in the form of a maximum deadload weight that may be associated with a given rezero operation. None of the weight readings $t_1$-$t_5$ of FIG. 3 have exceeded the rezero threshold, thus, there has been no actual rezero fault. However, passing a regression line through weight reading points $t_1$-$t_5$ in this case illustrates that the weighing apparatus is not operating under control but, rather, that the weight readings are increasing with each rezero operation. Further, the regression line can be seen to cross the rezero threshold line at a point prior to the next rezero timeout (next scheduled rezero). Consequently, a rezero fault is predicted in this case because the expected weight reading value that will be associated with the next rezero operation is forecast to exceed the threshold weigh amount.

Embodiments of the invention may also be adapted to permit user access to stored rezero data, and to transmit rezero-related messages and/or alerts to operators and other interested parties. Access to stored rezero data may be accomplished in various ways. Referring again to FIG. 1, one exemplary method of allowing Internet-based (web-based) access to remotely stored rezero data is illustrated. In this example, a user wishing to access stored rezero data would do so through a secure website. To this end, a web interface 35 is provided to allow user interaction with the remote server 15 of the external system 14. The web interface 35, which may be resident on for example, a web server, is also in communication with a user interface 40, and is responsible for interactions between users and the website and between the website and the remote server. For example, the web interface 35 may be responsible for presenting the correct web pages of the website to the user, such as in response to specific user queries. The web interface 35 may also be responsible for collecting user login information and checking it against a registered user database 45. The user interface 40 acts as a user portal to the remote server 15 and handles, via the web interface 35, all user requests and queries. The user interface 40 may reside on one or more web pages of the website.

An optional data interface 50 (e.g., one or more programs or modules) may also be provided to effectuate communication and/or data storage and retrieval with the database 30 at which the server stores received rezero data. Generally speaking, the data interface 50 may manage requests for data that are received from the remote server 15, and/or from users (e.g., operators and other interested parties) via a website and through the remote server, as described above. The data interface 50 may be responsible for tasks such as analyzing data requests, locating requested data, retrieving requested data from the database 30, and providing the data to the appropriate software application(s) associated with the remote server. The data interface 50 may also be responsible for converting the format of the retrieved data if it is not compatible with the software application(s).

As mentioned above, embodiments of the invention may also be adapted to transmit rezero-related messages and/or alerts to operators and other interested parties. Such messages may simply be periodic status updates, etc. Alternatively, alerts may be sent anytime a rezero fault occurs or a rezero fault is predicted. Referring again to the exemplary embodiment of FIG. 1, a communications interface 55 (e.g., one or more communications programs or modules) may be provided and associated with the remote server 15 to permit the remote server to transmit appropriate notifications subsequent to the receipt of rezero event data.

Figure 4:
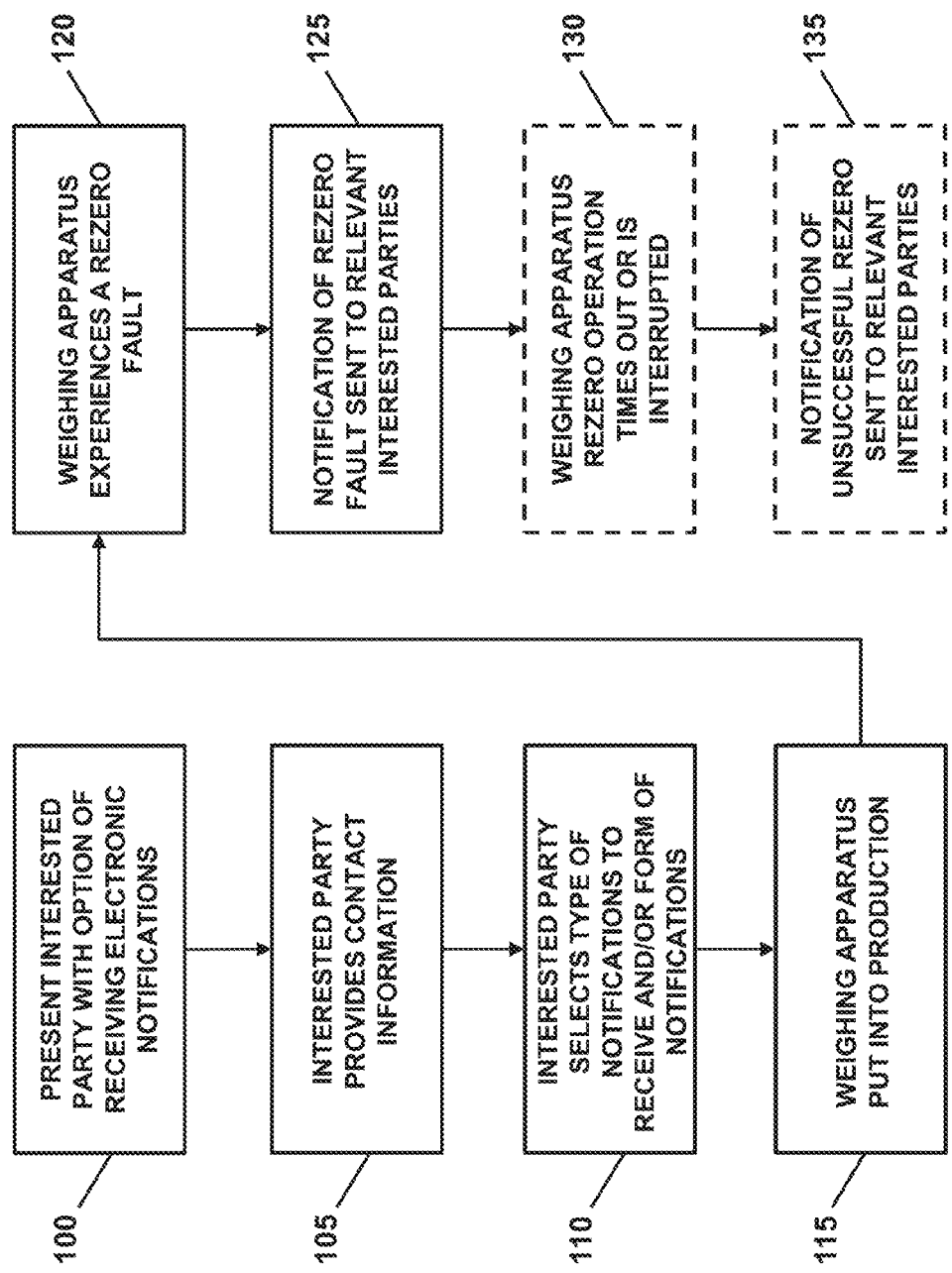
FIG. 4 is a flow diagram representing one exemplary process of alerting remotely located interested parties of an actual rezero fault.

One exemplary method for defining the party or parties to whom notifications will be transmitted and for monitoring the rezero status of a weighing apparatus and transmitting rezero messages/alerts relating thereto is illustrated in the flowchart of FIG. 4. More particularly, FIG. 4 illustrates a method of providing a remotely located interested party with an electronic notification of an actual rezero fault resulting from a rezero operation failing to execute within an allotted time period or being interrupted more than some predetermined number of acceptable times. Interested parties may be any number or operators, supervisors, managers, etc., that request notifications. Such notifications may be sent by a local-only notification system embodiment of the invention or by an embodiment that employs an external notification system.

In this exemplary process, one or more interested parties are presented with the option of receiving electronic notifications in the form of messages and/or alerts 100. Notifications may be transmitted to interested parties via a number of electronic communication methods, such as without limitation, email, text message or wireless page. Therefore, provided that an interested party elects to receive electronic notifications, the interested party provides contact information (e.g., an e-mail address, mobile telephone number and/or pager number) 105. The interested party also elects the type of notifications that they desire to receive, and/or the form in which the notifications should be delivered to the interested party 110.

Interested parties may register for rezero-related notifications in a number of ways. In one exemplary embodiment, interested parties may register for notifications via a web-based interface (see above). As described above, it may also be possible to register for notifications at the weighing apparatus (local system) level. Registered users may also be permitted to enter a list of contacts that will additionally receive notifications in response to individual events. In this manner, a single interested party may register a number of individuals rather than requiring every individual to be notified to register independently.

Once the weighing apparatus is put into production 115, interested parties who have signed up for a given notification(s) will receive the notification(s) when generated, via the contact information provided. In the example of FIG. 4, the weighing apparatus of interest experiences an actual rezero fault 120, and interested parties who have signed up to receive an alert upon the occurrence of an actual rezero fault are notified of the rezero fault 125 via the contact information provided previously. Similarly, and as alternatively indicated in FIG. 4, the occurrence of an unsuccessful scheduled rezero operation (rezero timeout) due to for example a failure to execute within an allotted time period or an excessive number of interruptions 130, may also cause an alert to be sent to interested parties who have signed up for such an alert 135. This allows an interested party to act on the rezero fault or not yet successful rezero operation.

Figure 5:
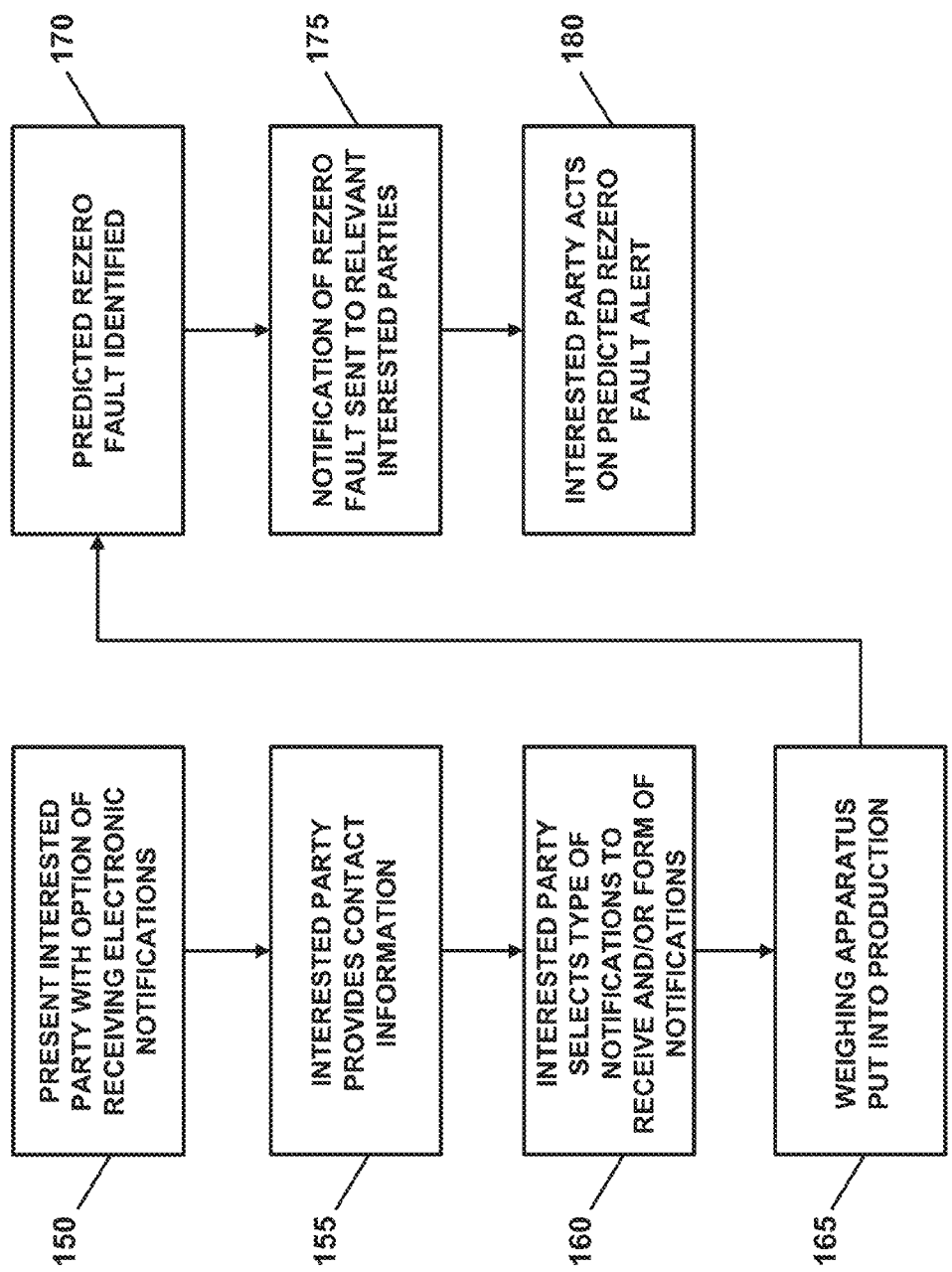
FIG. 5 is a flow diagram representing one exemplary process of alerting remotely located interested parties of a predicted rezero fault.

Another exemplary method for defining the party or parties to whom notifications will be transmitted and for monitoring the rezero status of a weighing apparatus and transmitting rezero notifications relating thereto is illustrated in the flowchart of FIG. 5. In comparison to the monitoring and notification method embodied in FIG. 4, the flowchart of FIG. 5 illustrates a method of providing a remotely located interested party with an electronic notification of a predicted rezero fault resulting from an identified trend in previous rezero weight readings. Such notifications may again be sent by a local-only notification system embodiment of the invention or by an embodiment that employs an external notification system.

In the exemplary process of FIG. 5, one or more interested parties are again presented with the option of receiving electronic notifications in the form of messages and/or alerts 150. Notifications may again be transmitted to interested parties via a number of electronic communication methods, such as without limitation, email, text message or wireless page. Therefore, provided that an interested party elects to receive electronic notifications, the interested party provides contact information (e.g., an e-mail address, mobile telephone number and/or pager number) 155. The interested party also again elects the type of notifications that they desire to receive, and/or the form in which the notifications should be delivered to the interested party 160. In this case, an interested party would have indicated a desire to be notified of predicted rezero faults.

Interested parties may register for predicted rezero fault notifications via a web-based interface, or in other ways, as described above. Registered users may again be permitted to enter a list of contacts that will additionally receive notifications in response to individual events.

Once the weighing apparatus is put into production 165, a local monitoring system will begin to monitor rezero operations and, in some embodiments, may report rezero data to a remote server for subsequent notification generation and possible data analysis. In this particular example, the rezero data obtained from the weighing apparatus of interest is indicative of a predicted rezero fault 170 (as described above). Consequently, interested parties who have signed up for predicted rezero fault notifications will receive an alert at some point after the predicted rezero fault is identified 175. This allows an interested party to act on the predicted rezero fault 180.

While the examples of FIG. 4 and FIG. 5 are specific to problem-related alerts, it should also be realized that exemplary systems and methods may send other types of notifications such as but not limited to periodic status messages, etc. Such status messages and other non-alert notifications may be sent on a scheduled basis or upon the occurrence of certain events or process milestones. Further, it is also possible to design a system where the nature or importance of certain messages or alerts will result in an override of any user-selected notification type restrictions—meaning that such messages or alerts will be sent to all users registered to a given weighing apparatus.

The time of sending alerts may also be varied. For example, in some cases, interested parties may receive an alert as soon as a predicted rezero fault is identified, regardless of how far in the future the rezero fault is predicted to occur. Alternatively, systems and method embodiments of the invention may categorize the trends used to identify predicted rezero faults, such as by severity, likelihood/probability, etc., (e.g., at "Last Rezero Measurement"=0.001: warning, at "Last Rezero Measurement"=0.01: severe warning) and may delay the sending of an associated alert until a given category is reached. A similar ranking or categorization may occur with respect to real-time rezero problems. For example, an alert of lower level may be sent when a rezero operation is initially interrupted, with one or more successively elevated alerts subsequently sent if additional interruptions also occur.

Alert thresholds can be similarly categorized. As such, given alerts and other messages may be transmitted to different individuals based on the categorization of the alert or message and a level or similar ranking associated with the individual. For example, as alerts increase in severity rating, they may be transmitted to individuals of increasingly higher ranking or authority within a given organization.

A number of actions may be taken when an interested party receives an alert of a real-time rezero problem. For example, the interested party may initiate some manual intervention of the weighing process and take whatever action is necessary to correct the problem associated with the alert. This may include, for example, manually removing build up from a weigh platform or creating spacing in the product flow of a checkweigher. An interested party may instead notify another party (e.g., an operator or other on-site employee) of the alert and the other party may take corrective action. Alternatively, and as mentioned above, the system may take automatic corrective action, which may or may not be verified or evaluated by an interested party.

A number of actions may be taken when an interested party receives an alert of a predicted rezero fault. For example, an interested party may more closely monitor a weighing operation or may initiate some manual intervention of the weighing process and take whatever action is necessary to correct the problem that is contributing to the trend. An interested party may instead notify another party (e.g., an operator or other on-site employee) to more closely monitor a particular aspect of the weighing process or to take corrective action. Alternatively, and as mentioned above, the system may take automatic corrective action, which may or may not be verified or evaluated by an interested party.

A system and method embodiment of the invention may also be used to monitor weighing apparatus functions other than rezeroing events and weighing-related process parameters. For example, a system and method of the present invention may also be used to monitor the function of non-weighing components of a weighing apparatus and/or to monitor associated devices such as conveyors, reject mechanisms, etc. Consequently, a system and method of the present invention may also be used to alert interested parties when a non-weighing component of a weighing apparatus or an associated device exceeds some predetermined process threshold or otherwise operates in an inappropriate manner (including becoming non-operational).

In view of the present disclosure or through practice of the present invention, it will be within the ability of one of ordinary skill to make modifications to the present invention, such as through the use of equivalent arrangements and compositions, in order to practice the invention without departing from the spirit of the invention as reflected in the appended claims.

What is claimed is:

1. A computerized method of monitoring and notifying one or more remotely located interested parties of the rezero status of a weighing apparatus, said method comprising:

providing a computerized local monitoring system to monitor a rezero status of at least one weighing apparatus of interest and to transmit weighing apparatus rezero data;

placing an external system in communication with the local monitoring system, the external system including a remote server configured at least to transmit an electronic notification to a remotely located interested party based on data received from the local monitoring system;

using associated programming to predict a rezero fault by:
(1) identifying a plurality of recorded rezero data deadload weight readings corresponding to a series of previous weighing apparatus rezero operations and received from the at least one weighing apparatus at times $t_1$ - $t_n$,
(2) identifying the point in time of a next scheduled weighing apparatus rezero operation, (3) identifying a predetermined weighing apparatus rezero threshold value in the form of a maximum deadload weight that may be associated with a given rezero operation, (4) applying linear regression analysis to the plurality of recorded rezero data deadload weight readings to predict whether the deadload weight as seen by the weighing apparatus would exceed the predetermined rezero threshold value prior to the identified next scheduled weighing apparatus rezero operation; and if it is predicted that the deadload weight as seen by the weighing apparatus would exceed the predetermined rezero threshold value prior to the identified next scheduled weighing apparatus rezero operation, using the remote server to transmit an electronic notification to a remotely located interested party.

2. The computerized method of claim 1, wherein the programming is associated with the local monitoring system.

3. The computerized method of claim 1, wherein the programming is associated with the remote server.

4. The computerized method of claim 1, further comprising the steps of:
presenting an interested party with the option of receiving electronic notifications;
acquiring contact information from the interested party; and
prompting the interested party to elect the types of notifications the interested party desires to receive.

5. The computerized method of claim 1, wherein the notification is an alert.

6. The computerized method of claim 5, wherein the alert is categorized by severity.

7. The computerized method of claim 6, wherein alerts are transmitted to different interested parties based on the categorization of the alert and a level or similar ranking associated with the interested party.

8. The computerized method of claim 1, wherein a transmitted notification includes a weighing apparatus identifier.

9. The computerized method of claim 1, wherein the local monitoring system is a part of a given weighing apparatus of interest.

10. The computerized method of claim 1, wherein the local monitoring system simultaneously monitors more than one weighing apparatus.

11. A computerized method of monitoring and notifying one or more remotely located interested parties of a weighing apparatus predicted rezero fault, said method comprising:
providing a computerized local monitoring system to monitor a rezero status of at least one weighing apparatus of interest and to transmit weighing apparatus rezero data;
placing an external system in communication with the local monitoring system, the external system including a remote server configured at least to transmit an electronic notification to a remotely located interested party based on data received from the local monitoring system;
using associated programming to predict a rezero fault by:
(1) plotting on a graph of deadload weight readings vs. time, a plurality of recorded rezero data deadload weight readings corresponding to a series of previous weighing apparatus rezero operations and received from the at least one weighing apparatus at times $t_1$-$t_n$, (2) identifying the current point in time relative to the recorded rezero weight readings, (3) identifying the point in time of a next scheduled weighing apparatus rezero operation, (4) identifying a predetermined weighing apparatus rezero threshold value in the form of a maximum deadload weight that may be associated with a given rezero operation, (5) fitting a linear regression line to the plotted weight readings, and (6) determining whether the linear regression line will cross a line representing the predetermined rezero threshold value prior to the identified next scheduled weighing apparatus rezero operation; and if it is determined that the linear regression line will cross the line representing the predetermined rezero threshold value prior to the identified next scheduled weighing apparatus rezero operation, using the remoter server to transmit an electronic notification of a predicted rezero fault to a remotely located interested party.

12. The computerized method of claim 11, wherein the programming is associated with the local monitoring system.

13. The computerized method of claim 11, wherein the programming is associated with the remote server.

14. The computerized method of claim 11, further comprising the steps of
presenting an interested party with the option of receiving electronic notifications;
acquiring contact information from the interested party; and
prompting the interested party to elect the types of notifications the interested party desires to receive.

15. The computerized method of claim 11, wherein the notification is an alert.

16. The computerized method of claim 15, wherein the alert is sent immediately upon identification of a predicted rezero fault.

17. The computerized method of claim 15, wherein the timing of sending the alert depends on the time until the predicted rezero fault.

18. A computerized method of monitoring and electronically notifying one or more remotely located interested parties of the rezero status of a weighing apparatus, said method comprising:
providing a computerized local monitoring system that monitors a rezero status of at least one weighing apparatus of interest and transmits electronic information about the rezero status of the monitored weighing apparatus;
placing an external system in communication with the local monitoring system, the external system including a remote server adapted to receive rezero data from the local monitoring system and to store at least some of the rezero data;
providing a web-based interface via which an interested party may register to receive from the remote server electronic notifications related to the rezero status of one or more weighing apparatus of interest to the interested party;
receiving, via the web-based interface, contact information from the interested party;
receiving, via the web-based interface, a selection of the types of notifications the interested party wishes to receive;

receiving, via the web-based interface, a selection of the form of notifications the interested party wishes to receive;

using programming associated with the remote server to predict a rezero fault by:

(1) plotting on a graph of deadload weight readings vs. time, a plurality of recorded rezero data deadload weight readings corresponding to a series of previous weighing apparatus rezero operations and received from the at least one weighing apparatus at times $t_1$-$t_n$, (2) identifying the point in time of a next scheduled weighing apparatus rezero operation, (3) identifying a predetermined weighing apparatus rezero threshold value in the form of a maximum deadload weight that may be associated with a given rezero operation, (4) fitting a linear regression line to the plotted weight readings, and (5) determining whether the linear regression line will cross a line representing the predetermined rezero threshold value prior to the identified next scheduled weighing apparatus rezero operation; and if it is determined that the linear regression line will cross the line representing the predetermined rezero threshold value prior to the identified next scheduled weighing apparatus rezero operation, using the remote server to transmit an electronic notification to a remotely located interested party.

19. The computerized method of claim 18, wherein the contact information received from an interested party is selected from the group consisting of a phone number, an email address, a SMS address, a MMS address, and any combination thereof.

20. The computerized method of claim 18, further comprising a local interface at a weighing apparatus via which an interested party may register to receive from the remote server electronic notifications related to the rezero status of one or more weighing apparatus of interest to the interested party.

21. The computerized method of claim 18, wherein an interested party, once registered, is permitted to enter a list of other interested parties who are to receive notifications.

* * * * *